April 16, 1929.  D. HEYNIS  1,709,529
DEVICE FOR PREVENTING THE BOILING OVER OF
LIQUIDS WHICH PRODUCE FOAM WHEN BOILING
Filed April 29, 1927

D. Heynis, INVENTOR

By: Marks & Clerk
Att

Patented Apr. 16, 1929.

1,709,529

UNITED STATES PATENT OFFICE.

DIRK HEYNIS, OF HAZERSWOUDE, RIJNDIJK, NETHERLANDS.

DEVICE FOR PREVENTING THE BOILING OVER OF LIQUIDS WHICH PRODUCE FOAM WHEN BOILING.

Application filed April 29, 1927, Serial No. 187,628, and in the Netherlands March 30, 1926.

The invention relates to a simple and practical device for preventing the cumbersome boiling over of milk or other liquids which produce foam when boiling, and is based upon the principle that by the production of foam, the centre of gravity is displaced, which displacement, provided it is directed sidewise, may be used for stopping or decreasing the heating.

For the said purpose it is already known to use a receptacle, which at a certain height is provided with an enlargement at one side, which by the boiling is filled with foam and by the tilting of the receptacle also with liquid, so that the latter is provided with a special support for preventing its falling over. Moreover the receptacle must be provided with an adjustable weight for enabling its use with different quantities of liquid. Thereby the receptacle becomes somewhat complicated and is therefore unpractical. As e. g. with an oilstove it is possible to get boiling at a considerable height above the flame, it is to be doubted, whether the minute lifting caused by the tilting of the receptacle will be sufficient for preventing further boiling. The latter disadvantage also appears with the known device in which the receptacle is provided with two pens, with which it may be hung between the sides of a rocking-chair-like support carrying at the other side a small auxiliary receptacle towards which the spout of the main receptacle is directed. The foam streaming through this spout is gathered within the auxiliary receptacle, whereby a sufficient displacement of the centre of gravity rsults for causing the main receptacle to be lifted through about one inch. It is evident that the auxiliary receptacle requires an additional cleaning.

According to the present invention however a support tiltable through a small angle is combined with a receptacle which at least in one horizontal direction is asymmetrical, which may be so placed upon the support, that the latter is caused to tilt by the raising of the foam, whilst means are applied for stopping or decreasing the heating through intermediary of the said tilting.

The said separate support renders it possible to have a receptacle, which is very simple and practical especially in view of its cleaning, which receptacle however must be of such a shape, that the same will not tilt itself.

The invention also enables to apply the adjusting means to the support instead of to the receptacle and to use a receptacle with substantially equal sections to the bottom, which is arranged at an oblique angle to the axis of the receptacle. Such a receptacle also has the advantage, that different quantities of the liquid may be boiled without requiring a long boiling of a small quantity before a sufficient horizontal displacement of the centre of gravity is attained.

Due to its small height, the support may remain upon the heating device when the latter is used for other purposes. For preventing the tilting of the said support under these circumstances, the same according to the present invention may be provided with means, e. g. a rotatable notch for providing an additional supporting point.

In the annexed drawing the invention is shown by way of an example:

Figure 1:
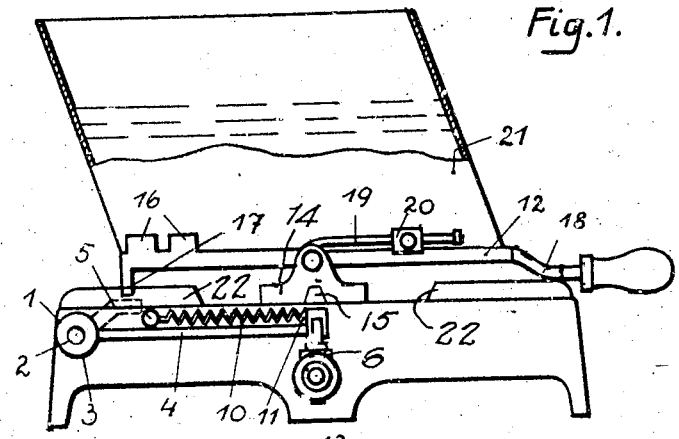
Figure 1 is a front elevation.

A burner 1 is provided with a rotatable shaft 2, which carries a head 3, a long arm 4 and a short arm 5. To the valve 6 there is connected an arm 7 with hook 8. The burner is provided with a pin 9 carrying a spring 10 with loop, the latter being held by the hook 8, the spring being of sufficient strength to close the valve. The arm 4 is provided with a notch 11, which may co-operate in such a manner with the arm 7, that against the action of the spring 10 the valve 6 is held open. Upon a downward movement of the arm 4 the arm 7 is free and thereby the spring 10 is allowed to close the valve at least to such an extent that boiling over is prevented. A support 12, which with its trunnions 13 is rotatable within two bearings 14, which may be placed over the brazier ribs 15, is provided with upward extending notches 16, a downward notch 17, a leg 18 and a flat bar 19 or rod with graduations, over which a weight 20 is slidable.

The device is completed by a receptacle 21 having substantially equal sections parallel to the bottom, which is situated at an oblique angle to the axis of the receptacle.

The device is to be used in this way:

The partially filled receptacle 21 as shown in Figure 1 is placed upon the support 12 resting against the notches 16 and the weight 20 is adjusted in such a manner, that the support remains in its horizontal position whilst its tilting may be caused very easily. Then the spring 10 is connected to the hook 8, the valve 6 is opened and by turning the head 3 the arm 4 is brought into a position for retaining the arm 7. After lighting the burner no further control is required, as due to the raising of the foam the support is caused to tilt, whereby the notch 17 presses upon the short arm 5, which results in a downward displacement of the long arm 4, so that the valve arm 7 is released.

Figure 2:
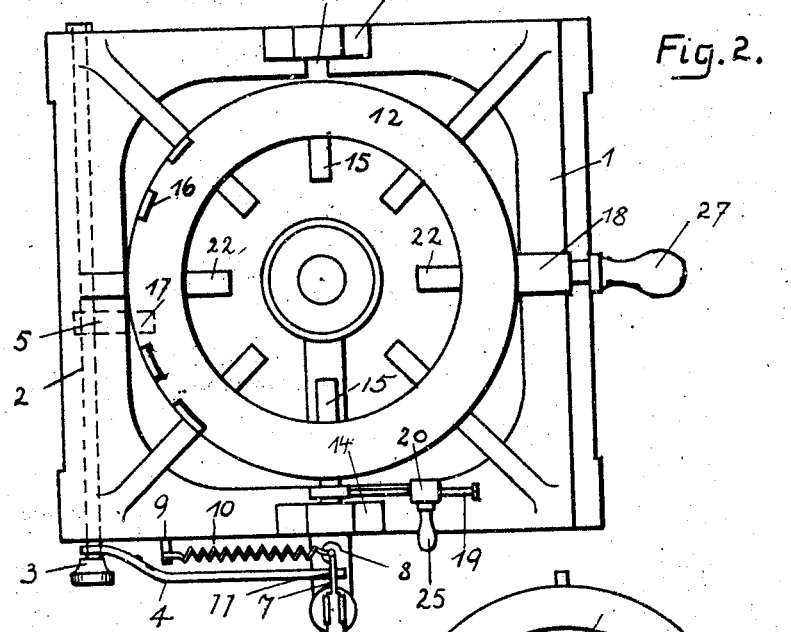
Figure 2 shows the corresponding plan view with the receptacle removed.
Figure 3:
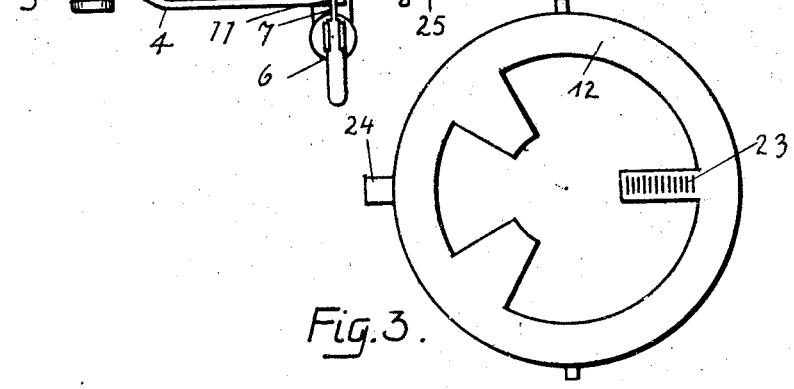
Figure 3 shows a plan view of another construction of the support.

In another embodiment of the invention, the support may be constructed as shown in Figure 3. Here the notches 16 and the adjusting device 19—20 are dispensed with and instead thereof only a strip 23 with graduations is used; at the other side the support is provided with a notch 24, which after being turned down prevents the tilting of the support. With this embodiment, adjustment is executed by displacing the receptacle itself. If usually e. g. ½ gallon milk is boiled, the corresponding graduation on 23 may be remembered, at which the right-hand side (according to Figure 1) of the receptacle is to be placed for having the desired sensibility for tilting. Besides that this embodiment is more simple, it has the advantage, that the support may remain upon the burner, when the latter is used for other purposes, under which circumstances the notch 24 is turned down, so that it rests upon the left-hand rib 22 (Figure 2).

If an electrical heating device is used an appropriate switch is used which is controlled by the tilting of the support; such measures are within the power of any expert and do not involve an inventive idea.

If desired wooden handles 25 and 26 may be applied to the weight 20 and the support respectively.

Having fully described my invention, what I claim is:

1. An improved device for preventing the boiling over of liquids which produce foam in boiling including a tiltable platform-like support, a receptacle removably mounted upon said support and having such shape as to cause a lateral displacement of the center of gravity of its contents when foam, irrespective of the level, is produced, heating means and means for controlling the heating means in response to the tilting movement of the platform-like support.

2. A device as claimed in claim 1, moreover comprising notches or the like against which the receptacle is to be placed and the provision of a weight connected to the platform-like support and adjustable in a horizontal direction at right angles to the tilting axis of said support.

3. A receptacle for use with a device as claimed in claim 1, in which horizontal cross sections of the receptacle have equal areas and are situated at an oblique angle to the axis of the receptacle.

In testimony whereof, I have signed my name to this specification.

DIRK HEYNIS.